Jan. 18, 1938.　　　H. J. WILSON　　　2,105,573
ELECTRICAL CONNECTING AND SUPPORTING MEANS
Filed June 4, 1935　　　2 Sheets-Sheet 2
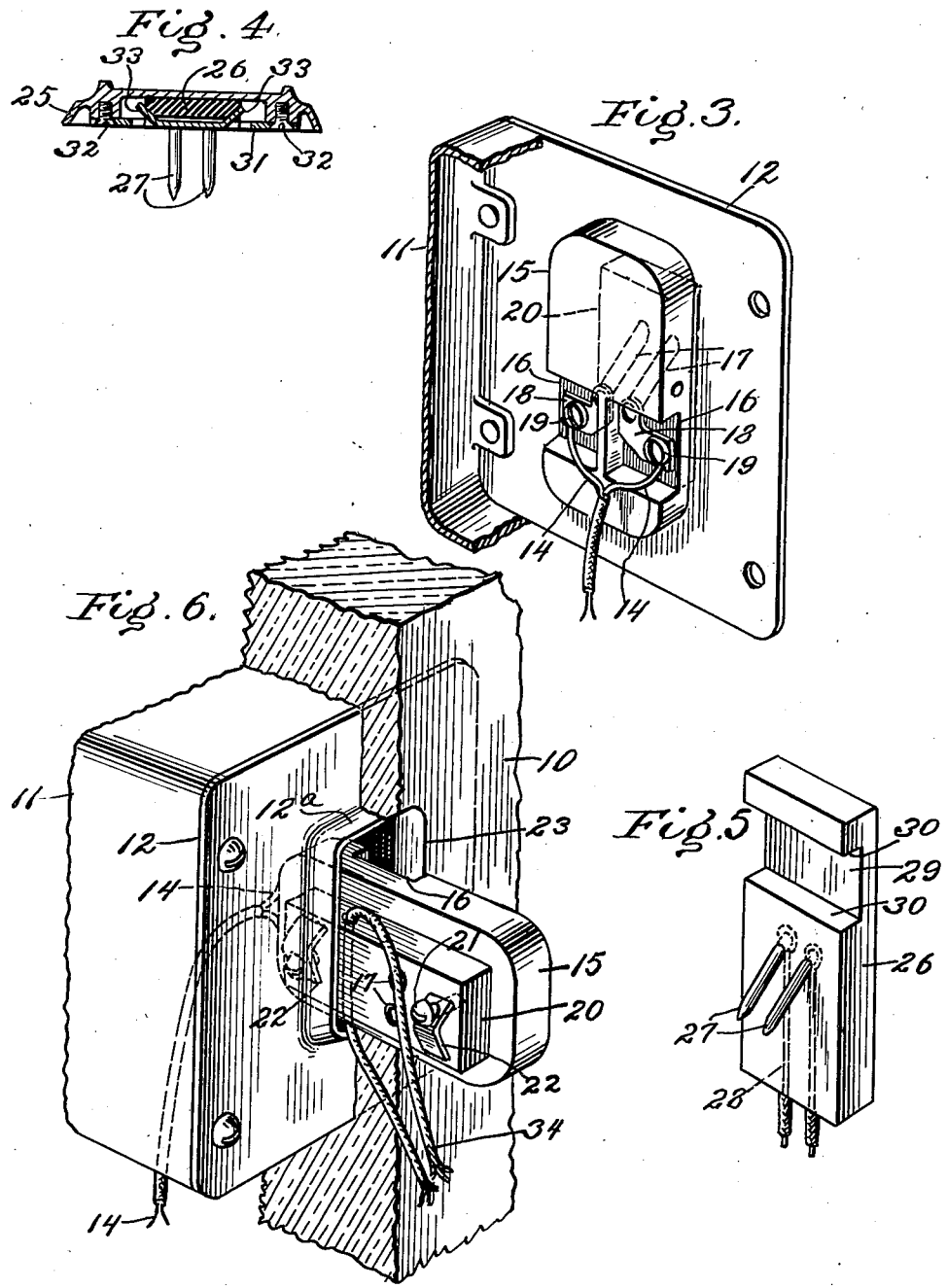
INVENTOR.
Herbert J. Wilson
BY
Geo. C. Wheelock
ATTORNEY.

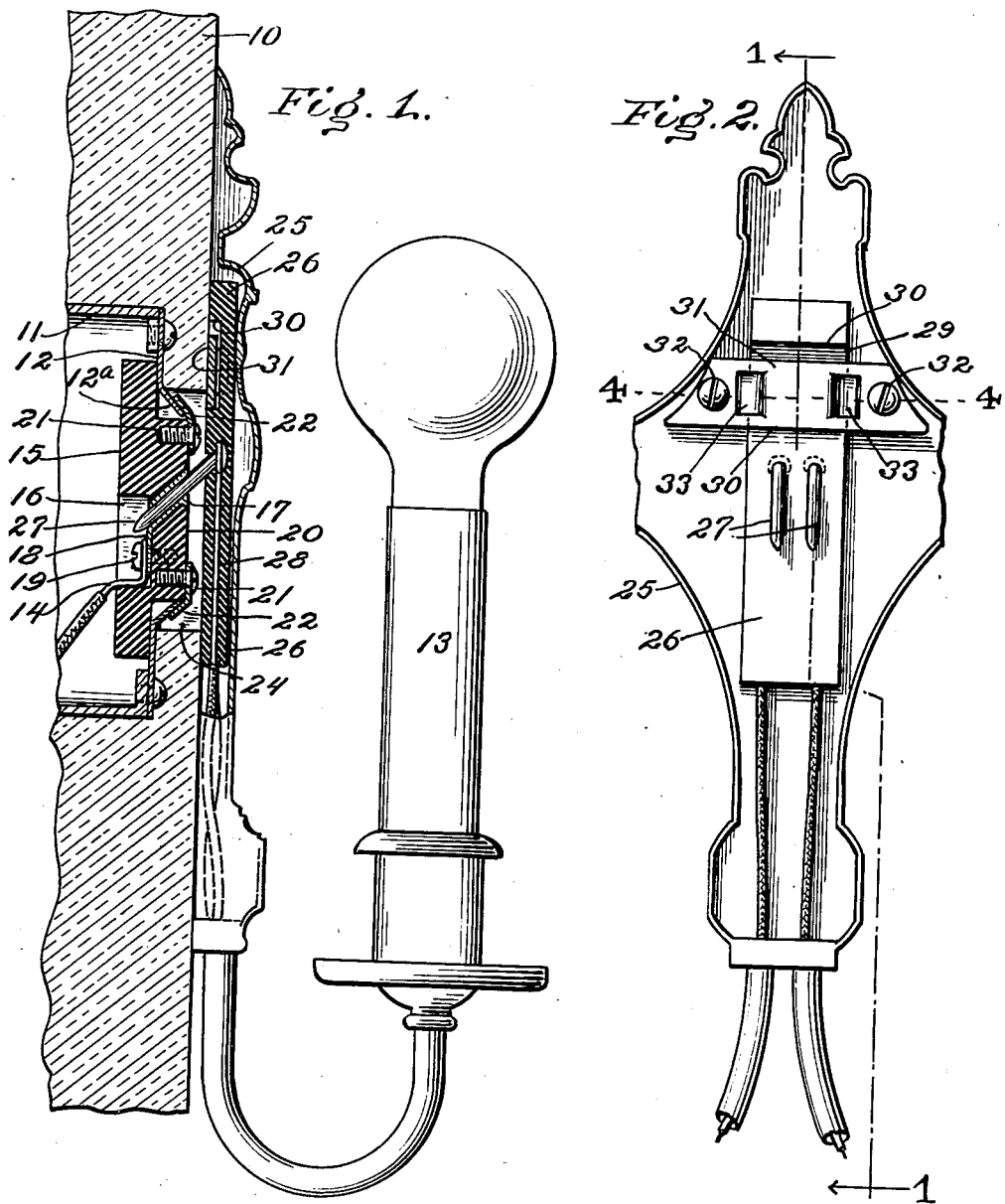

Patented Jan. 18, 1938

2,105,573

UNITED STATES PATENT OFFICE 2,105,573

ELECTRICAL CONNECTING AND SUPPORTING MEANS

Herbert J. Wilson, New York, N. Y.

Application June 4, 1935, Serial No. 24,798

4 Claims. (Cl. 173—330)

This invention relates to electrical connecting and supporting means for electric fixtures such as lamps, clocks and other such electrically controlled devices, particularly where such devices are to be supported directly on the finished surfaces of the walls of a room or compartment.

One of the objects of the invention is to provide electrical means for connecting an electric device with the feed wires or conductors which lead into an outlet box supported at the same wall at which the electric device is supported, parts of the connecting means constituting electric terminals located adjacent the face of the wall and which are detachably united, so as to enable the electric device to be directly mechanically supported on the wall, by means of such detachable terminals, whereby, for example, the painting or finishing of the wall at points surrounding the detachable terminals can be done without such defacement or damage to such wall surface as generally occurs when the electric conductors leading into the outlet box are so connected with the electric fixture or device that such connection is usually left as it is. In the latter case it is necessary before painting or finishing the wall surface to dismount the electric device from the wall or the like on which it is mounted and to pull the feed wires out from the outlet box sufficiently so as to enable proper finishing of the wall in the area directly around and at the surface against which the electric device has been attached, more painting being necessary after it is in place.

Other objects in addition to the above are to provide a thoroughly practical and efficient means for electrically connecting electric devices supported upon a wall or the like with the feed lines and to provide means for efficiently and rigidly supporting on a wall or the like an electric device which can be quickly connected with and disconnected from the feed lines, as well as to provide electrical conducting and supporting means which may be readily applied to the outlet box and connected with the feed wires in substitution for the usual continuous and not readily separable electrical connection between the feed wires and the electrical device, without having to disturb the outlet box or those parts of the wall directly adjoining it and its face plate.

The above being among the objects of the present invention, the same consists of certain features of construction and combinations of parts to be hereinafter described and then claimed with reference to the accompanying drawings illustrating one embodiment of the invention and wherein Fig. 1 is a side elevation of an electric lamp, together with a part of a supporting wall and the associated electrical connecting means in section on the line 1—1, Fig. 2, so far as the same parts are illustrated in both figures;

Fig. 2 is a rear elevation of the electric lamp fixture shown in Fig. 1, parts broken away, illustrating those parts of the electrical connecting and supporting means which are embodied with the lamp or other fixture to constitute a unit;

Fig. 3 is a rear perspective view of a face plate of an outlet box which is partly broken away, and of those parts of the electrical connecting means which are directly supported by the face plate;

Fig. 4 is a transverse section on the line 4—4 of Fig. 2;

Fig. 5 is a perspective view of the insulating member which is directly supported on the electric fixture or lamp, and Fig. 6 represents a broken section of a wall and a perspective view of an outlet box, broken away, together with the insulating member which is to be mounted within the outlet box, and illustrating how such insulating member may be introduced through the front opening of the outlet box.

Referring to Figs. 1, 3 and 6 of the drawings, the wall 10 of a room or an apartment is partially illustrated, the illustrated portion representing the plaster which is finished and painted on its exposed surface in any usual manner. An outlet box 11 and its face plate 12 are surrounded by the wall 10 in the usual manner, that is, they are built into the wall, the face plate 12 being set slightly back from the finished face of the wall. Upon the wall 10 there is supported the electric device or fixture to be controlled, such as a lamp 13.

The feed wires 14 for supplying the current enter the outlet box 11 and are suitably attached to a member 15 preferably formed of insulation in the shape of a block supported on the face plate 12 in the manner to be described. The insulating member 15 is provided with transverse recesses 16 and embedded therein is a pair of sockets 17 which may consist of copper bushings extending from the front face of the member 15 to the recesses 16. Each of the sockets 17 has a lateral extension 18 at its inner end which extends along the bottom of a corresponding recess 16, and through the extensions 18 there pass the binding posts 19 for establishing electrical connection between the adjacent ends of the feed wires 14 and the extensions 18. After the insulating member or block 15 has been fixed in position in the outlet box it is not usually necessary to disturb the electrical connection between the feed wires 14 and the sockets 17. It is preferred that the sockets 17 be shaped so as to incline forwardly and upwardly in the member 15 such sockets constituting terminal elements located in a fixed position behind the plane of the front wall surface.

The member or block 15 is provided with a reduced or smaller forward portion 20 into which screws 21 are let for forming pivots for metallic clips 22 or other fastenings which may be turned so as to be brought into engagement with the forward lip 12a of the face plate 12 of the outlet box. The lip 12a defines an opening 23 which registers with an opening 24 previously formed in the wall 10 during the construction thereof. It will be seen that when the larger portion of the member 15 is brought to bear upon the inner surface of the face plate 12, the fastening clips having first been set so as not to interfere with the entering of the reduced portion 20 into the opening 23, the clips 22 may be given a partial turn so as to extend over and be engaged with the flange 12a. If the clips 22 are bent to the shape shown, it is obvious that they may be of resilient metal, but if they are not resilient, the pivot screws 21 may be slightly loosened up to permit the proper engagement thereof with the flange 12a after which they are tightened so as to bind the clips upon such flange. On account of the manner in which it is preferred that the insulating block 15 is fitted to the face plate 12, it is preferred that the clips 22 be pivotally mounted on the outer face of the reduced portion 20 of the block, whereby they are rendered laterally retractible onto such face and are laterally projectable outside the area of such face for the purpose of engaging with the outward surface of the plate 12.

Referring to Figs. 1, 2, 4 and 5, the electric fixture or device 13 is preferably provided with a hollowed out base 25. Suitably supported within the hollow or cavity of base 25 there is a member 26 of insulating material preferably in the form of a flat oblong block which carries the pair of projecting metal pins 27 constituting electric terminals, the ends of the same being embedded in the insulating material, so that the projecting terminals extend inwardly and downwardly at an inclination. The projecting terminals 27 should be fixed in a rigid position on the member or block 26, so that they may be inserted and fitted within the terminal sockets 17, whereby to act as rigid mechanical means for supporting the electric fixture, while at the same time they permit the flow of current therethrough. Electric conductors 28 are embedded in insulating member 26 and are electrically connected on the one hand with the fixed terminals 27 and on the other hand they lead to the electrical device or fixture for supplying current to light a lamp or operate a clock or otherwise depending upon the function that the fixture is to perform.

Transverse of the member or block 26 there is formed adjacent to the terminals 27 a recess 29 which defines two transverse shoulders 30 at opposite sides thereof. Base 25 of the fixture carries a cross-piece or bar 31 attached thereto by means of screws 32 and such cross piece is provided with a pair of struck-up tongues 33. The cross-piece 31 when in place extends horizontally across the cavity or hollow of base 25 to hold the insulating member or block 26 in place. It will be seen that when the cross-piece 31 is removed, the member or block 26 may be placed in the position shown in Figs. 1 and 2 and then the cross-piece may be attached to the base 25 by the screws 32, thereby engaging the cross-piece in the recess 29, and the tongues 33 engaging the laterally opposite edges of the block 26, so as to hold the member or block 26 firmly in position on the base 25, whereby the parts just described constitute a unit of rigidly connected parts which may be handled as such.

It will be seen that the electric fixture or device may be readily mounted on or demounted from the wall 10 and that when the fixture is electrically connected with the feed wires 14, such device will at the same time be firmly supported upon the finished surface of the wall 10. The member or block 26 confined in the recess or cavity of the base 25 will also firmly rest upon the front surface of the wall. The outlet box 20 and its face plate 12 being rigidly mounted upon the wall 10 during the construction thereof, neither it nor the inner insulating member 15 will have to be disturbed, nor the wall, in removing or replacing the electric fixture in position on the wall, thereby permitting the painting and other finishing of the wall without encountering the posssibility of damage or injury to the wall, and then when the surface is finished the fixture may be replaced and a good job will be the result.

A preferred feature of the present invention resides in the possibility of placing the member 15 and its concommitant parts in the outlet box 11 without having to remove or cut away any parts thereof or of the wall 10. To such end the dimensions of the member or block 15 are such that as shown in Fig. 6, the same may be introduced lengthwise through the front opening 23 of the box after the feed wires 14 have been properly connected with the terminals thereof. The insertion of the parts through the opening 23 may be accomplished in any suitable manner as through the medium of a string 34 which may pass through a part of the member 15, and when the member 15 has been fully inserted it is obvious that with simple precautionary measures, the member 15 may be so adjusted and set within the box, in its proper position back of the face plate 12, so that the reduced portion 20 will extend forwardly within the flange or lip 12a, after which the fastening clips 22 are turned so as to engage such lip as shown in Fig. 1. The string 34 may then be cut off. It is obvious that other ways may be resorted to for placing the member 15 in position in the box, or removing it when required, as, for example, when the member has been placed in somewhat upright position in the box with the reduced portion 20 facing forwardly, a pair of pliers or some other suitable tool may be employed to engage some portion of the member 15 to introduce it into the box and to pull the said member forwardly, so that the fastening clips 22 may be turned.

It is obvious that the invention is susceptible to more or less modification without departing from the scope of the appended claims.

What I claim as new is,—

1. In means of the class described, the combination of a plate with an aperture and adapted to be embedded in a wall back of the face thereof, a block of insulation, such block having a smaller forward portion insertable outwardly into such aperture and fitting snugly therein, freely accessible movable means on the exposed front surface of such smaller portion for detachably securing the block in the fitted position, the movable means then bearing on the front surface of the plate, a pair of metallic sockets embedded in the block and connected with electric current supply conductors, the relative proportions of said block and aperture also being such that the block may be introduced from the front of the plate inwardly through the aperture to a position behind the plate and may then be adjusted, to insert the smaller portion outwardly into the aperture as before specified, a second block of insulation provided with a pair of projecting terminal elements rigid therewith for engagement in such sockets, and an electrically controlled device having a base on which the second block is located and fixedly mounted, with the projecting terminals projecting rearwardly therefrom, whereby the base of the device may be mounted against the face of such wall when the projecting terminals are pushed into the sockets for supporting the device from the block embodying the sockets.

2. In means of the class described, the combination with a wall having a plate with an aperture and embedded in the wall near the face thereof, a block of insulation, such block having a smaller forward portion insertable outwardly into such aperture and fitting snugly therein, means for detachably securing the block in the fitted position, a pair of metallic sockets embedded in the block and connected with electric current supply conductors, a second block of insulation provided with a pair of projecting terminal elements rigid therewith for engagement in such sockets, and an electrically controlled device having a base on which the second block is located and fixedly mounted, with the projecting terminals projecting rearwardly therefrom, whereby the base of the device may be mounted against the face of the wall when the projecting terminals are pushed into the sockets for supporting the device from the block embodying the sockets, the aperture having a length and width respectively less than the length and width of the block with the sockets, and the width and thickness respectively of the socket-block being less than the length and width of the aperture so that that block may be introduced lengthwise inwardly through the aperture to a position behind such plate and then be adjusted to enter the smaller portion thereof forwardly into the aperture previously to fixing such block in position and engaging the projecting terminals in the sockets.

3. In electrical connecting and supporting means, the combination with a wall having a plate with an aperture and embedded in the wall near the face thereof, a block of insulation, such block having a smaller forward portion insertable outwardly into such aperture and fitting snugly therein, means positioned movably on the front surface of such smaller portion for detachably securing the block in the fitted position by projection onto the face plate, whereby the block is firmly held in fitted position by the combined action of the larger part of the block and such securing means, a pair of metallic sockets embedded in the block and connected with electric current supply conductors, and an electrically controlled device having terminals extending rearwardly therefrom and adapted to be pushed into the sockets for supporting the device from the socket-block, the aperture having a length and width respectively less than the length and width of the larger portion of the socket-block, and the width and thickness respectively of the socket-block being less than the length and width of the aperture so that the block may be introduced inwardly through the aperture to a position behind the plate and then be adjusted to enter the smaller portion thereof forwardly into the aperture previously to fixing such block in position and engaging the rearward terminals in the sockets.

4. In means of the class described, the combination with a plate with an aperture, a block of insulation having a smaller forward portion insertable outwardly into such aperture and fitting therein, means for detachably securing the block in the fitted position, a pair of metallic sockets embedded in the block and connected with electric current supply conductors, a second block of insulation provided with a pair of projecting terminal elements for engagement in such sockets, and an electrically controlled device having a base on which the second block is located and fixedly mounted, with the projecting terminals extending rearwardly therefrom, whereby the base of the device may be mounted against the face of a wall when the projecting terminals are pushed into the sockets for supporting the device from the block embodying the sockets, the proportions of the first said block and of the aperture relative to each other being such that such block may be introduced inwardly through the aperture to a position behind such plate and then be adjusted to enter the smaller portion thereof forwardly into the aperture previously to fixing such block in position by the securing means and engaging the projecting terminals in the sockets.

HERBERT J. WILSON.